United States Patent [19]
Okami et al.

[11] Patent Number: 5,942,565
[45] Date of Patent: Aug. 24, 1999

[54] SHEET-SHAPED ADHESIVE COMPOSITION

[75] Inventors: Takehide Okami; Yuuki Sakurai, both of Usui-gun, Japan

[73] Assignee: Shin-Etsu Chemical Co., Ltd., Japan

[21] Appl. No.: 08/888,128

[22] Filed: Jul. 3, 1997

[30] Foreign Application Priority Data

Jul. 4, 1996 [JP] Japan ................................. 8-193924

[51] Int. Cl.$^6$ ................ C08K 5/34; C08K 5/15; C08K 5/48
[52] U.S. Cl. .................... 524/101; 524/720; 524/751
[58] Field of Search .................... 524/101, 720, 524/751

[56] References Cited

U.S. PATENT DOCUMENTS

| | | | |
|---|---|---|---|
| 3,888,815 | 6/1975 | Bessmer et al. .................... | 524/703 |
| 4,147,685 | 4/1979 | Smith, Jr. .................... | 524/284 |
| 5,426,151 | 6/1995 | Brandt et al. .................... | 524/866 |
| 5,468,794 | 11/1995 | Stein et al. .................... | 524/703 |

FOREIGN PATENT DOCUMENTS

A 1141972  2/1989  Japan .

*Primary Examiner*—Kriellion S. Morgan
*Attorney, Agent, or Firm*—Millen, White, Zelano, & Branigan, P.C.

[57] ABSTRACT

An adhesive sheet is obtained by sheeting a claylike silicone composition comprising an organopolysiloxane, a filler, and an adhesive aid to a gage of 0.1 to 5 mm. The adhesive sheet is easy to handle and bondable to such adherends as metals and plastics to exert a high bond strength.

12 Claims, No Drawings

SHEET-SHAPED ADHESIVE COMPOSITION

BACKGROUND OF THE INVENTION

1. Field of the Invention

This invention relates to a sheet-shaped adhesive silicone composition.

2. Prior Art

Adhesives have been used in a wide variety of industrial fields including aircraft, space, vehicle, ship, construction, building, electric and electronic fields. Inter alia, silicone adhesives have improved heat resistance, freeze resistance, weather resistance and electrical insulation and are advantageously used in applications where conventional adhesives could not be utilized.

Most conventional silicone adhesives, however, are filled in tubes and cartridges since they are liquid or paste. The silicone adhesives are generally classified into two groups, (i) those adhesives like silicone sealants which crosslink into an elastomer through reaction with moisture in air and bond to adherends through condensation reaction of hydrolyzable silane and (ii) those adhesives which are prevented from reaction by inhibitors during storage, but crosslink into an elastomer upon heating on use and bond to adherends through addition reaction of adhesive aids promoted by platinum catalysts. Since these silicone adhesives are liquid or paste and sticky, many inconvenient problems arise. They stick to the hand and adhere to and stain unnecessary portions upon accidental contact. They are inconvenient to handle. Where parts are to be bonded, fine adjustment or alignment is difficult. The adhesive cannot be applied to a uniform thickness. If the adhesive is moved during cure, air can penetrate into the adhesive to weaken the bond strength or exacerbate the insulating function.

To overcome these problems, JP-A 141972/1989 proposes a film-shaped silicone adhesive composition using hydrophobic reinforcing silica prepared by a wet process. This film-shaped silicone adhesive composition is satisfactorily applicable to such adherends as glass and silicone rubber, but fail to provide an acceptable bond strength when applied to such adherends as metals and plastics. The silica used therein is not readily available.

SUMMARY OF THE INVENTION

Therefore, an object of the present invention is to provide a silicone adhesive composition in sheet form which is easy to handle and well adhesive to a variety of substrates.

According to the invention, there is provided an adhesive composition comprising (A) an organopolysiloxane, (B) a filler, and (C) an adhesive aid, which is claylike and shaped into a sheet of 0.1 to 5 mm thick.

In one preferred embodiment, the sheet-shaped adhesive composition is defined as comprising
(A) an organopolysiloxane of the following average compositional formula (1):

$$R_a SiO_{(4-a)/2} \quad (1)$$

wherein R is a substituted or unsubstituted monovalent hydrocarbon group and letter a is a positive number of 1.95 to 2.05, having an average degree of polymerization of at least 3,000,
(B) a filler,
(C) an adhesive aid in the form of a silane- or siloxane-modified isocyanurate compound of the following general formula (2):

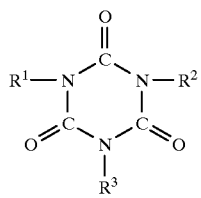

(2)

wherein each of $R^1$, $R^2$, and $R^3$ is hydrogen, a substituted or unsubstituted monovalent hydrocarbon group or a group of the following general formula (3):

$$-(CH_2)_m-SiR^4_3 \quad (3)$$

wherein $R^4$ is an alkyl, alkoxy or $-(O-SiR^5R^6)_n-R^7$ group, each of $R^5$, $R^6$, and $R^7$ is an alkyl or alkoxy group, letter m is an integer of 1 to 3, and n is an integer of 0 to 8, with the proviso that at least one of $R^1$, $R^2$, and $R^3$ is a group of formula (3), or an epoxy- or (meth)acryl-containing silane or siloxane, and
(D) an organic peroxide.

The sheet-shaped adhesive composition of the invention is easy to handle and firmly bonds to a variety of substrates including metals and plastics.

Prior art liquid silicone adhesive compositions fail to fully utilize the features and functions of silicone because of their liquid nature. Prior art organic peroxide-vulcanization type silicone compositions known as millable type silicone compositions are claylike, but not adhesive. Heretofore no practical sheet-shaped silicone adhesive compositions have been available. By the present invention, a practical sheet-shaped silicone adhesive composition is first provided.

DETAILED DESCRIPTION OF THE INVENTION

The sheet-shaped adhesive of the invention is a silicone composition comprising (A) an organopolysiloxane, (B) a filler, and (C) an adhesive aid. The composition is claylike and shaped into a sheet having a thickness of 0.1 to 5 mm. Preferably the silicone composition contains components (A) to (D).

Component (A) is an organopolysiloxane having an average degree of polymerization of at least 3,000, preferably 3,000 to 20,000, more preferably 4,000 to 10,000. Included are highly viscous to raw rubber like organopolysiloxanes. The organopolysiloxane is of the following average compositional formula (1).

$$R_a SiO_{(4-a)/2} \quad (1)$$

Herein, R is a substituted or unsubstituted monovalent hydrocarbon group, preferably having 1 to 12 carbon atoms, more preferably 1 to 8 carbon atoms. Examples include alkyl groups such as methyl, ethyl and propyl, alkenyl groups such as vinyl and allyl, aryl groups such as phenyl and tolyl, and substituted ones of these groups wherein some or all of the hydrogen atoms are replaced by halogen atoms such as chlorine and fluorine atoms and cyano groups, for example, chloromethyl, trifluoropropyl and cyanoethyl. The presence of two or more alkenyl groups in a molecule is preferred. Letter a is a positive number of 1.95 to 2.05. The organopolysiloxanes used herein are usually those organopolysiloxanes whose backbone is composed of dimethylsiloxane units while those organopolysiloxanes having another group such as vinyl, phenyl, and trifluoropropyl incorporated in the backbone are also useful. Preferably the organopolysiloxanes Zare end-blocked with a triorganosilyl group such as trimethylsilyl, dimethylvinylsilyl, methyldivinylsilyl and trivinylsilyl or a dimethylhydroxysilyl group.

Component (B) is a filler which can be selected from fillers commonly used in conventional silicone rubber compositions. Examples include fumed silica, precipitated silica, hydrophobic silica, carbon black, titanium dioxide, ferric oxide, aluminum oxide, aluminum nitride, boron nitride, zinc oxide, quartz flour, diatomaceous earth, calcium silicate, talc, bentonite, glass fibers, organic fibers, metal powders, and metal whiskers alone or in admixture of two or more. Among these fillers, silica, carbon black, glass fibers and organic fibers are reinforcing fillers; carbon black, metal powders, and metal whiskers impart electric conductivity; and carbon black, titanium dioxide and aluminum hydroxide, when combined with platinum compounds, impart flame retardance. An appropriate filler may be used in accordance with a particular application of the adhesive composition.

The amount of the filler (B) is determined in accordance with the desired function and the oil absorption, surface area, specific gravity and other factors of the filler used.

wherein $R^4$ is an alkyl, alkoxy or —(O—$SiR^5R^6$)$_n$—$R^7$ group, each of $R^5$, $R^6$, and $R^7$ is an alkyl or alkoxy group, letter m is an integer of 1 to 3, and n is an integer of 0 to 8. At least one of $R^1$, $R^2$, and $R^3$ is a group of formula (3).

The monovalent hydrocarbon groups represented by $R^1$, $R^2$, and $R^3$ are preferably those having 1 to 12 carbon atoms, especially 1 to 8 carbon atoms, for example, alkyl groups such as methyl, ethyl and propyl, alkenyl groups such as vinyl and allyl, aryl groups such as phenyl and tolyl, and substituted ones of these groups wherein some or all of the hydrogen atoms are replaced by halogen atoms such as chlorine and fluorine atoms and cyano groups, for example, chloromethyl, trifluoropropyl and cyanoethyl. The alkyl and alkoxy groups represented by $R^4$, $R^5$, $R^6$, and $R^7$ are preferably those having 1 to 6 carbon atoms.

Instead of or in addition to the silane- or siloxane-modified isocyanurate compound of formula (2), there may be used a silane or siloxane containing an epoxy or (meth) acryl group, for example, γ-glycidoxypropyltrimethoxysilane, γ-methacryloxypropyltrimethoxysilane, and cyclic siloxanes as shown below. These silanes and siloxanes should preferably contain an alkoxy or SiH group in their molecule.

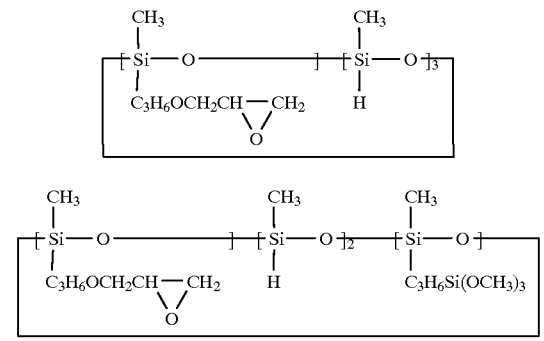

Preferably the filler is blended in amounts of less than about 900 parts, more preferably about 5 to 600 parts by weight per 100 parts by weight of the organopolysiloxane (A). With more than 900 parts of the filler, an adhesive layer as cured would become brittle.

Component (C) is an adhesive aid which is a silane- or siloxane-modified isocyanurate compound of the following general formula (2) or an epoxy- or (meth)acryl-containing silane or siloxane.

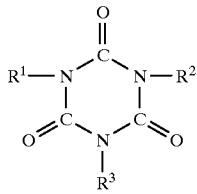

(2)

In formula (2), each of $R^1$, $R^2$, and $R^3$ is hydrogen, a substituted or unsubstituted monovalent hydrocarbon group or a group of the following general formula (3):

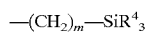

(3)

The amount of the adhesive aid (C) used is not critical although the adhesive aid is preferably blended in amounts of about 0.1 to 10 parts, more preferably about 0.5 to 5 parts by weight per 100 parts by weight of the organopolysiloxane (A). More than 10 parts of the adhesive aid would achieve no further improvement in adhesion whereas adhesion would be short with less than 0.1 part of the adhesive aid.

In the sheet-shaped adhesive composition of the invention, an organic peroxide is preferably blended as component (D) along with components (A) to (C) for causing the organopolysiloxane (A) to crosslink for improving the cure of the composition and the bond thereof to adherends.

Useful organic peroxides include those commonly used in conventional silicone rubber compositions. Examples include ketone peroxides such as methyl isobutyl ketone peroxide and cyclohexanone peroxide; peroxyketals such as 2,2-di-(t-butylperoxy)butane and n-butyl 4,4'-di-t-butylperoxyvalerate; hydroperoxides such as cumene hydroperoxide and t-butylhydroperoxide; dialkyl peroxides such as dicumyl peroxide and di-t-butyl peroxide; diacyl peroxides such as 2,4-dichlorobenzoyl peroxide and o-chlorobenzoyl peroxide; peroxy esters such as t-butylperoxyneohexanoate and t-butylperoxybenzoate; and peroxycarbonates such as diisopropylperoxydicarbonate and di-(3-methoxybutyl)peroxydicarbonate, alone or in admixture of two or more. Where the adherend is a thermoplastic resin, a choice is preferably made of those peroxides having a low decomposition temperature since low-temperature cure is required. For storage stability, a choice is preferably made of those peroxides having a 10-hour half-life temperature of lower than 80° C.

The amount of the organic peroxide (D) used is not critical although the peroxide is preferably blended in amounts of about 0.1 to 5 parts, more preferably about 0.5 to 3 parts by weight per 100 parts by weight of the organopolysiloxane (A). More than 5 parts of the peroxide would achieve no further improvement in cure properties and add to the cost whereas less than 0.1 part of the peroxide would result in short cure.

In addition to the aforementioned components (A) to (D), an organopolysiloxane of a resin structure containing a $SiO_2$ unit, $ViR'_2SiO_{1/2}$ unit and $R'_3SiO_{1/2}$ unit wherein Vi is vinyl and R' is a monovalent hydrocarbon group free of an aliphatic unsaturated bond may be added to the silicone composition of the invention, if necessary for enhancing the strength of a cured product. Platinum compounds may also be added for improving flame retardancy. Other useful additives are heat resistance modifiers such as cerium oxide, coloring agents such as pigments, and plasticity adjusting wetters such as methylpolysiloxanes both end-blocked with a hydroxyl group having a degree of polymerization of about 10 to 100 and vinyl-containing methylpolysiloxanes having a degree of polymerization of about 100 to 1,500.

The sheet-shaped adhesive composition of the invention is prepared by milling the essential and optional components in any desired mixer such as roll mills, kneaders, muller mixers and Shinagawa type mixers and then sheeting the mix into a sheet of desired gage by a suitable means such as roll mills, calender rolls, extruders and coating machines. The adhesive composition is shaped into a sheet having a gage of 0.1 to 5 mm, preferably 0.5 to 3 mm. Sheets with a gage of less than 0.1 mm would be too thin to provide a bond strength, and air is readily introduced therein when its thickness is changed by external forces. Sheets with a gage of more than 5 mm are inconvenient to handle and sometimes low in adhesion.

The sheet-shaped adhesive composition of the invention is claylike. It preferably has a plasticity of 100 to 400, more preferably 100 to 200 as measured according to JIS C2123. With a plasticity of more than 400, the step of bonding the adhesive sheet to an adherend often requires a greater pressing force as would deform the adherend. There would additionally result poor adhesion to the adherend and a low bond strength. An adhesive composition with a plasticity of less than 100 would change its thickness under the weight of an adherend, hindering precise attachment.

Prior to use, the sheet-shaped adhesive composition of the invention is preferably covered on both surfaces with protective sheets in a releasable manner for the protection purpose, that is, for protecting from external factors such as debris, dust, moisture and force. The protective sheets used herein are not critical although polyethylene sheets are often used from the standpoints of operation and cost.

On use, the sheet-shaped adhesive composition of the invention is pressed against an adherend under a pressure of about 0.1 to 100 $kgf/cm^2$ and heated at a temperature of about 80 to 180° C. for about 5 to 120 minutes. Then the adhesive attached to the adherend cures to complete a bond.

The sheet-shaped adhesive composition of the invention is a silicone adhesive composition which has the advantages of ease of handling and high bond strength as well as the improved properties of silicone such as heat resistance, freeze resistance, weather resistance, and electrical insulation. It is applicable to such adherends as metals and plastics.

EXAMPLE

Examples of the present invention are given below by way of illustration and not by way of limitation. All parts are by weight.

Example 1

To 100 parts of a dimethylvinyl-terminated polydimethylsiloxane consisting of 99.95 mol % of a $(CH_3)_2SiO_{1/2}$ unit and 0.05 mol % of a $(CH_2=CH)(CH_3)_2SiO_{1/2}$ unit and having an average degree of polymerization of 4,500 were added 30 parts of fumed silica having a specific surface area of 300 $m^2/g$ surface treated to be hydrophobic and 0.2 part of divinyltetramethylsilazane. The mixture was heat treated in a kneader at 180° C. for 2 hours. After the mixture was cooled, it was mixed with 1.2 parts of a partially silane-modified isocyanurate compound of formula (a) shown below as an adhesive aid and 1.8 parts of a paste containing 50% by weight of o-monochlorobenzoyl peroxide in a twin-roll mill. On analysis, the resulting compound had a plasticity of 210.

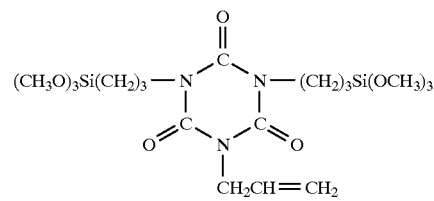

... (a)

The compound was sheeted to a gage of 2.1 mm by means of a twin-roll mill and then cut to a size of 10 mm×25 mm, obtaining adhesive sheets.

One adhesive sheet was sandwiched between adherends of glass and polycarbonate (PC), pressed to a gage of 2.0 mm, and heated at 120° C. for 30 minutes for curing. On analysis, the cured adhesive had a volume resistivity of $2\times10^{14}$ $\Omega\cdot cm^3$ and a shear bond strength of 14 $kgf/cm^2$.

Example 2

To 100 parts of a dimethylvinyl-terminated polydimethylsiloxane consisting of 99.95 mol % of a $(CH_3)_2SiO_{1/2}$ unit and 0.05 mol % of a $(CH_2=CH)(CH_3)_2SiO_{1/2}$ unit and having an average degree of polymerization of 4,500 were added 20 parts of fumed silica having a specific surface area of 300 $m^2/g$ surface treated to be hydrophobic, 2.0 parts of hexamethylsilazane, and 0.2 part of divinyltetramethylsilazane. The mixture was heat treated in a kneader at 180° C. for 2 hours. After the mixture was cooled, it was mixed with 0.24 part of an octanol solution of chloroplatinic acid in a platinum concentration of 1% by weight for imparting flame retardancy, 0.03 part of benzotriazole, 6.0 parts of black iron oxide, 0.6 part of cerium oxide, 1.2 parts of a partially silane-modified isocyanurate compound of formula (a) as an adhesive aid, and 2.0 parts of a paste containing 50% by weight of 2,4-dichlorobenzoyl peroxide in a twin-roll mill. On analysis, the resulting compound had a plasticity of 130 and a flame retardancy rating of UL 94 V-0 at a gage of 1.0 mm.

The compound was sheeted to a gage of 2.2 mm by means of a twin-roll mill and then cut to a size of 10 mm×25 mm, obtaining adhesive sheets.

A first adhesive sheet was sandwiched between adherends of aluminum (Al) and polycarbonate (PC). A second adhesive sheet was sandwiched between adherends of stainless steel SUS304 and polybutyl terephthalate (PBT). The adhesive sheets were pressed to a gage of 2.0 mm and heated at 80° C. for 60 minutes for curing. On analysis, the first and second cured adhesives had a shear bond strength of 48 kgf/cm² and 46 kgf/cm², respectively.

Example 3

To 100 parts of a dimethylvinyl-terminated polydimethylsiloxane consisting of 99.85 mol % of a $(CH_3)_2SiO_{1/2}$ unit and 0.15 mol % of a $(CH_2=CH)(CH_3)_2SiO_{1/2}$ unit and having an average degree of polymerization of 7,500 were added 10 parts of fumed silica having a specific surface area of 300 m²/g surface treated to be hydrophobic and 350 parts of spherical aluminum oxide AO-41R (trade name by Adoma Fine K.K.). The mixture was heat treated in a kneader at 150° C. for 2 hours. After the mixture was cooled, it was mixed with 1.5 parts of an octanol solution of chloroplatinic acid in a platinum concentration of 1% by weight for imparting flame retardancy, 2.0 parts of carbon black, 5.0 parts of γ-glycidoxypropyltrimethoxysilane as an adhesive aid, and 8.0 parts of a paste containing 20% by weight of dicumyl peroxide in a twin-roll mill. On analysis, the resulting compound had a plasticity of 360 and a flame retardancy rating of UL 94 V-0 at a gage of 1.0 mm.

The compound was sheeted to a gage of 0.6 mm by means of a twin-roll mill and then cut to a size of 10 mm×25 mm, obtaining adhesive sheets.

One adhesive sheet was sandwiched between a pair of aluminum plate, pressed to a gage of 0.5 mm, and heated at 180° C. for 5 minutes for curing. On analysis, the cured adhesive had a shear bond strength of 25 kgf/cm².

Example 4

Adhesive sheets were prepared as in Example 2 except that 1.0 part of γ-(methacryloxypropyl)trimethoxysilane was used instead of adhesive aid (a). A similar adhesion test was carried out.

The results of Examples 1 to 4 are shown in Table 1.

TABLE 1

| Example | 1 | 2 | 3 | 4 | |
|---|---|---|---|---|---|
| Plasticity (JIS C2123) | 210 | 130 | 360 | 140 | |
| Sheet gage (mm) | 2.1 | 2.2 | 0.6 | 2.2 | |
| Cured flame retardancy (UL94) | — | V-0 | V-0 | — | |
| Adherends | glass/PC | Al/PC | SUS/PBT | Al/Al | Al/PC | SUS/PBT |
| Cured adhesive gage (mm) | 2.0 | 2.0 | 2.0 | 0.5 | 2.0 | 2.0 |
| Shear bond strength (kgf/cm²) | 14 | 48 | 46 | 25 | 28 | *17 |

*partially stripped from SUS

Japanese Patent Application Nos. 193924/1996 and 241439/1996 are incorporated herein by reference.

While the invention has been described in what is presently considered to be a preferred embodiment, other variations and modifications will become apparent to those skilled in the art. It is intended, therefore, that the invention not be limited to the illustrative embodiments, but be interpreted within the full spirit and scope of the appended claims.

We claim:

1. An adhesive composition comprising
   (A) an organopolysiloxane of the following average compositional formula (1):

$$R_aSiO_{(4-a)/2} \tag{1}$$

wherein R is a substituted or unsubstituted monovalent hydrocarbon group and letter a is a positive number of 1.95 to 2.05, having an average degree of polymerization of at least 3,000,
   (B) a filler,
   (C) an adhesive aid in the form of a silane- or siloxane-modified isocyanurate compound of the following general formula (2):

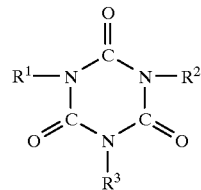

(2)

wherein each of $R^1$, $R^2$, and $R^3$ is hydrogen, a substituted or unsubstituted monovalent hydrocarbon group or a group of the following general formula (3):

$$-(CH_2)_m-SiR^4_3 \tag{3}$$

wherein $R^4$ is an alkyl, alkoxy or $-(O-SiR^5R^6)_n-R^7$ group, each of $R^5$, $R^6$, and $R^7$ is an alkyl or alkoxy group, letter m is an integer of 1 to 3, and n is an integer of 0 to 8, with the proviso that at least one of $R^1$, $R^2$, and $R^3$ is a group of formula (3), and
   (D) an organic peroxide the composition being clay like and shaped into a sheet of 0.1 to 5 mm.

2. A sheet-shaped adhesive composition comprising
   (A) an organopolysiloxane of the following average compositional formula (1):

$$R_aSiO_{(4-a)/2} \tag{1}$$

wherein R is a substituted or unsubstituted monovalent hydrocarbon group and letter a is a positive number of 1.95 to 2.05, having an average degree of polymerization of at least 3,000,
   (B) a filler,
   (C) an adhesive aid in the form of an epoxy- or (meth)acryl-containing silane or siloxane, and
   (D) an organic peroxide, the composition being clay like and shaped into a sheet of 0.1 to 5 mm thick.

3. The sheet-shaped adhesive composition of claim 2 having a plasticity of 100 to 400 as measured according to JIS C2123.

4. The sheet-shaped adhesive composition of claim 2 having opposed surfaces which are covered with protective sheets.

5. A sheet shaped adhesive composition of claim 2, wherein the adhesive aid is a (meth) acryl-containing silane or siloxane.

6. An adhesive composition as in claim 2, wherein the adhesive aid is gamma-methacryloxypropyltrimethoxysilane or gamma-glycidoxypropyltrimethoxysilane.

7. An adhesive composition as in claim 1, wherein the adhesive aid is present in an amount within the range of 0.1 to 10 parts by weight per 100 parts by weight of organopolysiloxane (A).

8. An adhesive composition as in claim 1, wherein the organo polysiloxane of the average compositional formula (1) is a dimethylvinyl-terminated polydimethylsiloxane.

9. An adhesive composition as in claim 2, wherein the organo polysiloxane of the average compositional formula (1) is a dimethylvinyl-terminated polydimethylsiloxane.

10. The sheet-shaped adhesive composition of claim 2 having a plasticity of 100 to 400 as measured according to JIS C2123.

11. The sheet-shaped adhesive composition of claim 2 having opposed surfaces which are covered with protective sheets.

12. An adhesive composition as in claim 2 wherein the adhesive aid is present in an amount within the range of 0.1 to 10 parts by weight per 100 parts by weight of organopolysiloxane (A).

* * * * *